United States Patent [19]
Takami et al.

[11] Patent Number: 5,415,049
[45] Date of Patent: May 16, 1995

[54] SYSTEM AND METHOD FOR MEASURING THE SPEED OF FLUID FLOW OF VARYING DIRECTION

[75] Inventors: Shinichi Takami; Hiroyuki Ohno, both of Niigata, Japan; Thomas Wiesinger, Wolfsgraben, Austria; Kotaro Yokoyama, Niigata, Japan

[73] Assignee: Director General of Hokuriku National Agricultural Experiment Station, Niigata, Japan

[21] Appl. No.: 139,151

[22] Filed: Oct. 21, 1993

[30] Foreign Application Priority Data

Oct. 28, 1992 [JP] Japan .................................. 4-312736

[51] Int. Cl.⁶ .............................................. G01F 1/34
[52] U.S. Cl. .............................................. 73/861.42
[58] Field of Search ........... 73/861.42, 861.65, 861.66, 73/170.11, 170.14, 861.63, 861.61

[56] References Cited

U.S. PATENT DOCUMENTS

| | | | |
|---|---|---|---|
| 3,646,811 | 3/1972 | DeLeo et al. | 73/861.65 |
| 4,522,077 | 6/1985 | Koberle | 73/861.63 |
| 4,825,704 | 5/1989 | Aoshima et al. | 73/861.42 |
| 4,920,808 | 5/1990 | Sommer | 73/861.42 |
| 5,099,686 | 3/1992 | Kohler | 73/861.65 |
| 5,154,513 | 10/1992 | Beer | 73/861.61 |
| 5,172,592 | 12/1992 | Fisher | 73/861.42 |

*Primary Examiner*—Richard F. Chilcot, Jr.
*Assistant Examiner*—Harshad Patel
*Attorney, Agent, or Firm*—Nikaido, Marmelstein, Murray & Oram

[57] ABSTRACT

An object of spherical shape is disposed in such a way that it changes the speed of any flow of two-dimensionally varying direction to the same extent. The dynamic pressure on the object, relative to the ambient, is so measured that there exists a unique and theoretically determined relation between the pressure and the speed of approaching flow.

4 Claims, 2 Drawing Sheets

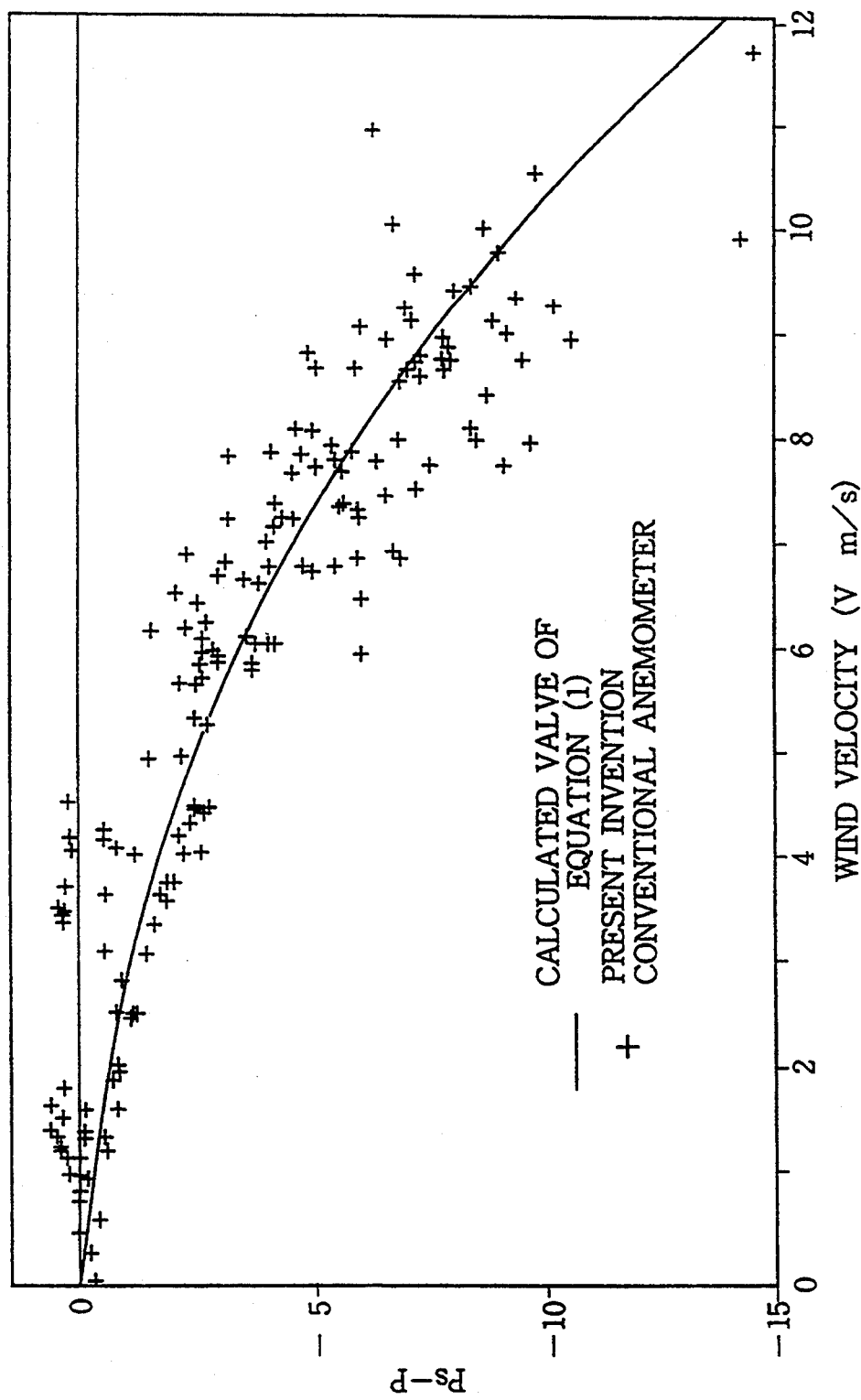

SYSTEM AND METHOD FOR MEASURING THE SPEED OF FLUID FLOW OF VARYING DIRECTION

BACKGROUND OF THE INVENTION

The present invention relates to a method commonly used for measuring flow speed which can be categorized into manometric (pressure detecting), thermal, sonic, and rotation measurement. The manometric method utilizes a pitot tube or various head meters. The method is excellent in that the devices involved are simple and invulnerable. Furthermore, it requires no calibration in principle, since the method is based on the fundamental laws of fluid mechanics. Thus, the pitot tube has been the standard instrument for the flow speed measurement. However, the pitot tube method requires complicated manipulation or instrumentation when used for the flow of varying direction, a well-known Dynes instrument or its modern versions being a good example. Head meters such as a venturi tube and an orifice meter can be only applicable to the unidirectional, confined flow in a conduit.

The thermal method such as hot-wire and thermometer technique is based on the dependence of cooling rate on the flow speed. Response of a hot-wire or thermocouple anemometer is fast thereby making the method useful for turbulence measurements. However, this method is not used in operational measurements, because deposit of dust, rain or snow can cause very large errors.

The sonic or acoustic method which relies on the dependence of the transit time of a sonic pulse on the transmitting medium is also very useful in the study of high-frequency flow measurements. However, this method is not used in operational measurements either for the similar reasons to the thermal method. Both hardware and data processing involved are complicated and the system is very expensive.

Thus, the method using the rotation meters is the only method that is employed in long-term routine measurements in the field. Cup or propeller anemometers and current meters are accurate and durable, and, in a usual environment will give years of reliable measurements with little maintenance. However, these instruments too are subject to erroneous operation where heavy snowfall and freezing prevent rotors from rotating. Also, rotors are occasionally blown out by strong gusts of heavy storms.

SUMMARY OF THE INVENTION

The primary object of the present invention is to provide a method for measuring the flow speed of fluid in environments where flow direction changes continually and adverse conditions prevent conventional instruments from operating properly.

The present invention is a means for measuring continually the speed of flow of varying direction in terms of the pressure of the flow on an object. The object is so designed and manipulated that the relation between the pressure distribution along its surface and flow speed is to be known theoretically.

An example of an embodiment of the present invention consists of a pair of pressure ports, a precision pressure transducer, and a signal and data processing unit. One of the pressure port, mounted on the orifice of the hollow circular cylinder, is a hemispherical pressure probe to measure the dynamic pressure on the top of the sphere, whereas the other is a reference pressure probe to measure the static pressure of the flow. Cylinder is placed with its axis perpendicular to the flow. The pressure difference between two ports is detected and processed to give the flow speed according to the basic laws of fluid dynamics.

Additional object and features of the present invention will become apparent from the following description with reference to the accompanying drawings.

BRIEF DESCRIPTION OF DRAWINGS

FIG. 2 is a graph showing the relation between the measurements with the present instrument and a standard anemometer.

DETAILED DESCRIPTION OF THE PREFERRED EMBODIMENT

Figure 1:
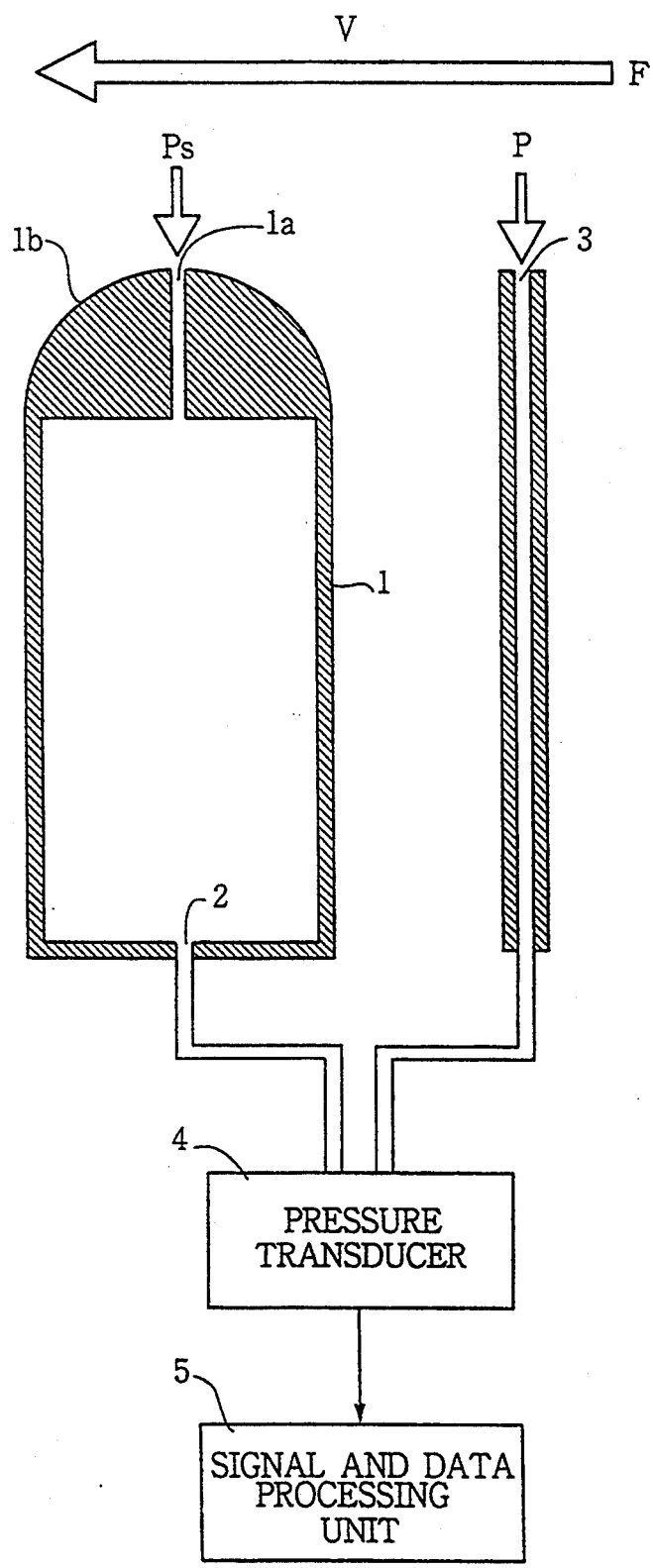
FIG. 1 is a schematic diagram showing an anemometer as an embodiment of the present invention.

FIG. 1 shows an anemometer as an embodiment of the present invention. It is designed to measure the two-dimensional horizontal wind speed. It consists of a cylindrical container 1 with a hemispherical cap 1b at the one end, a pressure transducer 4 with a pair of pressure inlets 2 and 3, and a signal and data processing unit 5.

The dynamic pressure inlet 2 is open to a cylindrical chamber to which the pressure at the center of the hemispherical cap $P_s$ is introduced via a perpendicularly perforated hole 1a. The reference pressure inlet 3 is placed at a distance from the hemi-spherical object so as to measure the static pressure of the flow (i.e., the atmospheric pressure, P). The pressure transducer 4 detects the differential pressure between the two inlets. The pressure difference thus detected is then transmitted to the signal processing unit which in turn converts the signals to the wind speed V using the principles of fluid mechanics.

The pressure difference is caused by the existence of the hemispherical object (to be referred to the probe hereafter) in the flow. The air with the approaching speed of V in the direction of F, as shown in FIG. 1, changes its speed as it flows along the periphery of the probe. The air is at rest where it collides against the cylinder, and increases its speed until it becomes maximum at the top of the probe. The wind speed decreases thereafter, and returns to the original one as the air leaves the probe. Such change in the flow speed is related to the pressure difference according to the theories of fluid mechanics:

$$P_s - P = \tfrac{1}{2}\rho V^2 (1 - c^2) \tag{1}$$

where $\rho$ is the density of the fluid, and c is the constant that is to be determined theoretically according to the shape of the probe and the angle between the direction of the perforated hole 1a and the flow direction. As eq(1) indicates the pressure difference increases curve-linearly with increasing flow speed. Thus, we can measure V by measuring $P_s - P$ with the instrument of a known constant c. For the flow normal to the axis of the cylinder (FIG. 1), c is equal to 1.5.

FIG. 2 is an example showing the basic performance of the present embodiment. Crosses in the figure are observed data points in the field. The wind speeds V were measured with a standard propeller anemometer and the pressure difference $P_s - P$ with the present embodiment. The curve in the figure represents the theoretical relation calculated from eq(1) with c=1.5. Satisfactory agreement between the measurement and the prediction by eq(1) demonstrates the capability of the present invention as a means to measure the average speed of flow of varying direction.

The present invention is a manometric flow measurement based on the fundamental laws of fluid mechanics. In principle, therefore, the instrument involved requires no calibration. In other words, the present method provides the absolute measurement of flow speed just as a pitot tube does.

The present embodiment operates as a pitot tube when the cylindrical container is held parallel to the flow with the hole 1a directed upstream.

The constant c in eq(1) becomes zero and eq(1) reduces the principle of the standard pitot tube measurement. The present embodiment can be therefore regarded as a generalization of a pitot tube.

Our method has several other attractive features. The response of the system is inherently fast, being only limited by the pressure transducer and tubing which transfer the pressure to the transducer. A preliminary comparison with a ultrasonic anemometer has provided an evidence to support this claim. It is therefore applicable to the high-frequency measurement of atmospheric turbulence. The flow sensor (probe) is robust and invulnerable, since its structure is very simple with no external moving parts. This is advantageous over conventional rotation meters in a variety of situations, for instance, those where heavy snowfall or freezing conditions could hamper the proper function of the instrument.

While the presently preferred embodiment of the present invention has been shown and described, it is to be understood that this disclosure is for the purpose of illustration and that various changes and modifications regarding the design of the pressure ports and tubing arrangement may be made without departing from the scope of the invention as set forth in the appended claims.

What is claimed is:

1. A system without moving parts for measuring a flow speed of a fluid of varying direction in one plane of measurement, comprising:
    an object to change a speed of approaching flow along a periphery of said object, said object is perpendicular to a plane of measurement, wherein the object is rotationally symmetrical about an axis, and is either hemispherical or spherical, said object being positioned with said axis perpendicular to the flow or the plane of measurement of flow speed;
    a first detecting means, provided in said object, for measuring a first static pressure of the flow applied on a top surface of the object;
    a second detecting means, located substantially at distance from said object, for measuring a second static pressure of the flow undisturbed by said object; and
    a signal and data processing means for producing the flow speed using said first and second static pressures.

2. The system according to claim 1, wherein the first detecting means is an opening and conduit perforated along an axis of said object, the second detecting means is a thin tubing or any other known static tube with an opening parallel to a measuring plane, and the pressure signals from both the first and second detecting means are of a) respectively fed to a pair of absolute pressure transducers, and b) together fed to a differential pressure transducer.

3. The system according to claim 1, wherein the signal and data processing mans is a unit to convert pressure difference between said first and second detecting means into the flow speed using a relationship theoretically derived from fundamental laws of fluid mechanics.

4. A method for measuring a flow speed of a fluid of two-dimensionally varying direction in a non-rotational manner comprising the steps of:
    designing and disposing an object that is rotationally symmetrical about an axis, and is either hemispherical or spherical in such a way that said axis is perpendicular to a plane of measurement, therein changing to a same extent a speed of incident flow from any direction along the measuring plane as the flow passes said axis;
    detecting two static pressures, one at a position on a surface of said object intersected by said axis, and another at a position where the flow is undisturbed by said object; and
    converting a pressure difference thus detected into the flow speed by the following equation $$Ps - P = \tfrac{1}{2}\rho V^2 (1 - c^2)$$

wherein Ps is static pressure of a generally accelerated flow on the object, P is a static pressure of undisturbed flow, $\rho$ is a density of the fluid, V is an approaching speed of the flow, and c is a theoretically known constant depending on a shape of the object and an angle between a direction of a radial toward a point of pressure measurement and the approaching flow.

* * * * *